United States Patent [19]

Teske

[11] 4,240,322
[45] Dec. 23, 1980

[54] WEDGE-PIN FASTENER

[76] Inventor: Lothar Teske, Hegelstr. 1,5000 Cologne, Fed. Rep. of Germany

[21] Appl. No.: 971,395

[22] Filed: Dec. 20, 1978

[30] Foreign Application Priority Data

Dec. 31, 1977 [DE] Fed. Rep. of Germany ... 7740307[U]
May 20, 1978 [DE] Fed. Rep. of Germany ....... 2822036

[51] Int. Cl.$^3$ ..................... F16B 19/02; F16B 21/00
[52] U.S. Cl. ............................................ 85/7; 85/8.1
[58] Field of Search ................. 85/5 CP, 5 M, 5 N, 7, 85/8.1; 151/5

[56] References Cited

U.S. PATENT DOCUMENTS

| 743,794 | 11/1903 | Adreon | 85/7 X |
|---|---|---|---|
| 1,000,445 | 8/1911 | Sims | 85/7 |
| 1,107,490 | 8/1914 | Butts | 85/7 X |
| 1,167,697 | 1/1916 | Hyde | 85/7 |
| 1,226,440 | 5/1917 | Asplet | 151/5 |
| 1,261,598 | 4/1918 | Northey | . |
| 1,446,080 | 2/1923 | Zilliok | 85/7 UX |
| 1,515,518 | 11/1924 | Owens | 85/7 |
| 1,636,824 | 7/1927 | Melberg | 85/7 |
| 1,731,423 | 10/1929 | Kempf | 85/7 UX |
| 1,737,091 | 11/1929 | Northey | 85/7 |
| 1,796,793 | 3/1931 | Kempf | 85/8.1 |
| 1,815,098 | 7/1931 | Earhart | 85/7 |
| 2,514,692 | 7/1950 | Carson | . |
| 2,543,701 | 2/1951 | Lindemann | 85/7 |
| 2,884,100 | 4/1959 | McKee | 85/15 P X |
| 2,933,794 | 4/1960 | Biesecker | . |
| 2,973,982 | 3/1961 | Elting et al. | . |
| 3,498,175 | 3/1970 | Goodstein | 85/8.1 |

FOREIGN PATENT DOCUMENTS

| 619487 | 9/1935 | Fed. Rep. of Germany . |
| 523321 | 8/1962 | Fed. Rep. of Germany . |
| 6806949 | 3/1969 | Fed. Rep. of Germany . |
| 2065777 | 8/1971 | France . |
| 28761 | 5/1964 | German Democratic Rep. . |
| 622156 | 4/1949 | United Kingdom . |

Primary Examiner—Thomas J. Holko
Attorney, Agent, or Firm—Karl F. Ross

[57] ABSTRACT

A fastener for joining a pair of elements comprises a fastener member having an elongated stem provided at one end with an enlarged head and formed spaced from this head with a transversely throughgoing passage. This fastener member is insertable through aligned holes in the elements to be joined with the head bearing on one of the elements and the passage exposed at the other of the elements. A plastically deformable elongated wedge is driven through the passage so that its intermediate portion lies in the passage and its end portions lie on either side of the stem. One longitudinal edge of this wedge bears in one direction on the other element and another longitudinal edge bears in the opposite direction on the stem in the passage. After being driven in, the end portions of the wedge are bent over to lock the assembly tightly together.

9 Claims, 13 Drawing Figures

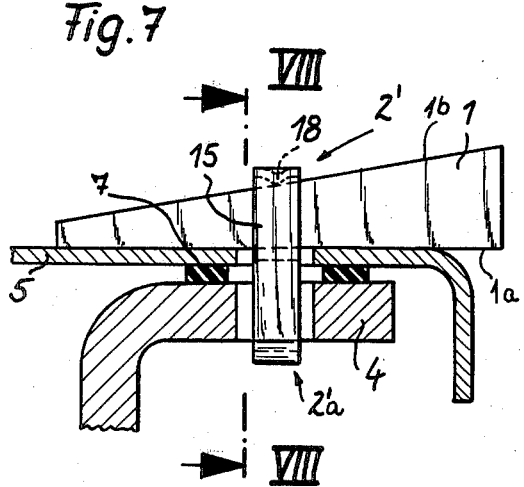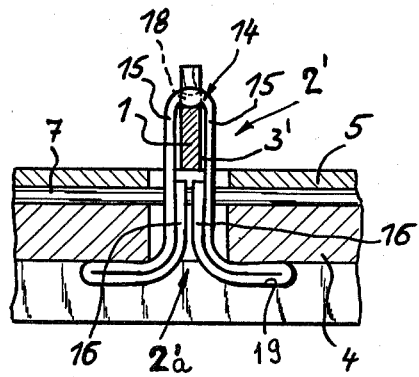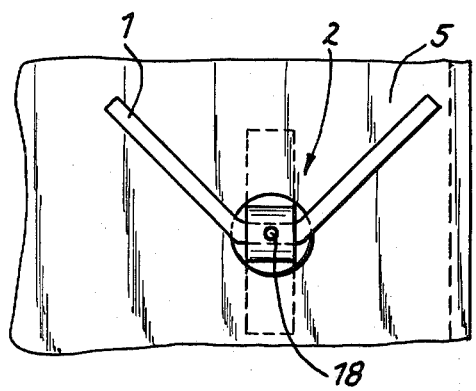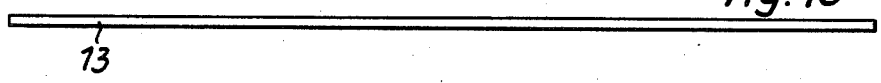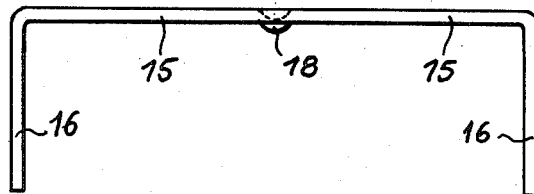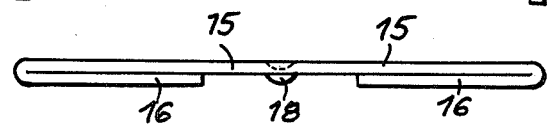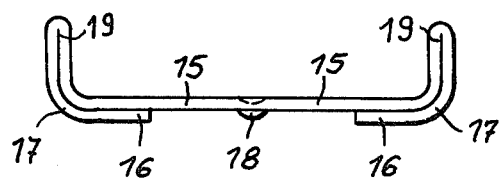

WEDGE-PIN FASTENER

FIELD OF THE INVENTION

The present invention relates to a fastener. More particularly this invention concerns such a fastener usable for securely but releasably holding together a pair of plates, as well as to a tool for installing such a fastener.

BACKGROUND OF THE INVENTION

When it is necessary to fasten two elements together, as a pair of metal plates or a metal plate and a supporting bar, it is standard practice to use a simple screw and nut. Such an arrangement allows the tool elements to be secured together with considerable force, yet nonetheless usually allows subsequent disassembly. The disadvantage of this type of arrangement is that the screw and nut are relatively expensive, and once badly corroded it is often very difficult to open up such a fastener. What is more it is necessary normally to use a pair of separate tools, commonly a screwdriver or allen key and a wrench of some type, to install such a fastener.

It is also known to rivet together a pair of elements. Such a system has the advantage that a rivet is normally a very inexpensive item. Nonetheless even more elaborate tools are needed for riveting than for securing a screw-and-nut fastener. In addition subsequent removal of a rivet is often extremely difficult, requiring laborious drilling-out of the rivet or grinding-off of its head.

It is also known, in particular on farm equipment, to secure elements together by means of a bolt having a stem extending through aligned holes in the elements to be joined, a head to one side of the elements, and a transversely throughgoing bore to the other side of these elements. A cotter pin is passed through this transversely throughgoing bore after the bolt has been pushed through the elements, and this cotter pin is then bent over. Such an arrangement can be made at relatively low cost, and can even be unfastened relatively easily by merely straightening out or cutting off the inexpensive cotter pin. Nonetheless such a system has the enormous disadvantage that it can not secure two elements tightly together, but can only be used in arrangements where considerable play is permissible between the elements being secured together.

OBJECTS OF THE INVENTION

It is therefore an object of the instant invention to provide an improved fastener.

Another object is to provide such a fastener which can be produced at relatively low cost, which can be installed with ease and without the use of complicated tools, which can be removed relatively easily even if badly corroded, and which will hold two or more elements tightly together.

Another object is to provide a tool for installing such a fastener.

SUMMARY OF THE INVENTION

These objects are attained according to the instant invention in a fastener having a fastener member in turn having an elongated stem provided at one end with an enlarged head and formed spaced from this head with a transversely throughgoing passage. The fastener member is insertable through aligned holes in the elements to be fastened together with its head bearing on one of the elements and the passage exposed at the other of the elements. A plastically deformable elongated wedge is inserted through this passage and has an intermediate portion in the passage and a pair of end portions flanking the intermediate portion and extending in opposite directions therefrom. These end portions are both bent laterally out of line with the intermediate portion to lock the fastener in place. The wedge has one longitudinal edge which bears in one direction in the element not engaged with the head of the member and another longitudinal edge bearing in the opposite direction on the stem of the fastener member in the passage and forming an acute angle with this one edge.

Thus it is possible to secure two elements together with the fastener according to this invention merely by inserting the fastener member through two aligned holes in the two elements, then pushing the wedge, small end first, through the passage in the fastener member. This action secures the two items temporarily together and even holds the fastener member in place. Thereupon the wedge is normally driven tightly into the passage so that it forces the two elements tightly against the head, and then the two end portions of the wedge are bent over to prevent the wedge from slipping out. The result is an extremely neat and rigid fastener which nonetheless can be produced at extremely low cost, at a unit price of only slightly higher than that of a rivet. The fastening member itself can be forgeheaded, and the wedge can be made of mild steel at a very low cost.

In order to release the fastener it is merely necessary to straighten out the wedge and withdraw it from the passage. It is also entirely possible simply to break off the small end of the wedge and then pull out the remaining intermediate portion. In all cases the fastener member at least can be reused many times, at worst only the inexpensive wedge need be replaced.

According to this invention the longitudinal edges of the wedge form an angle of less than 20°, normally between 8° and 12°. Similarly the end surface of the passage that is turned toward the head forms an angle of less than 30°, preferably between 16° and 24° with a plane perpendicular to the stem axis. The use of these two relatively small angles therefore ensures an excellent mechanical advantage when driving the wedge longitudinally into the passage, so that the two elements being secured together will be held very tightly.

According to further features of this invention the fastener member may be a simple rivet-type pin having a part-spherical head forming a perpendicular shoulder on the stem. The passage through it is a rectangular section and the end surface facing toward the head forms a central ridge or point.

It is also in the scope of this invention to use a fastener member formed of a single bent metallic strip or bar. To this end the bar is first formed with a small boss in the center on which the one edge of the wedge will engage. The free ends of this bar are then bent in so that they have double thickness, then the extreme outer ends of the doubled strip are bent up to form a pair of feet. Finally the entire strip is bent down into a U-shape with the feet projecting outwardly and the free ends of the strip engaged between the sides forming the U. The result is an extremely inexpensive yet very sturdy fastener forming in its U-shape stem a recess, yet having two feet engaging tightly against the elements being held together. Such an arrangement can use a wedge identical to that used with the bolt-type member and is installed according to this invention by means of a hammer having on one side a flat face used to pound the wedge into the passage, and on its opposite side a concavity with flat sides forming an angle between 100° and 120°. This forked side is brought against the straight wedge after it is driven in place to bend over both of its end portions and prevent withdrawal of the wedge. It is necessary to bend over both end portions at the same time in order to prevent the stem merely from rotating about its own axis as the one end portion or the other is struck.

BRIEF DESCRIPTION OF THE DRAWING

FIG. 7 is a view similar to FIGS. 1 and 2 showing another fastener in accordance with the instant invention;

FIG. 8 is a sectional view taken along VIII—VIII of FIG. 7;

FIG. 9 is a top view of the fastener of FIG. 7; and

FIGS. 10–13 are views showing formation of the fastener member of the fastener of FIG. 7.

SPECIFIC DESCRIPTION

Figure 1:
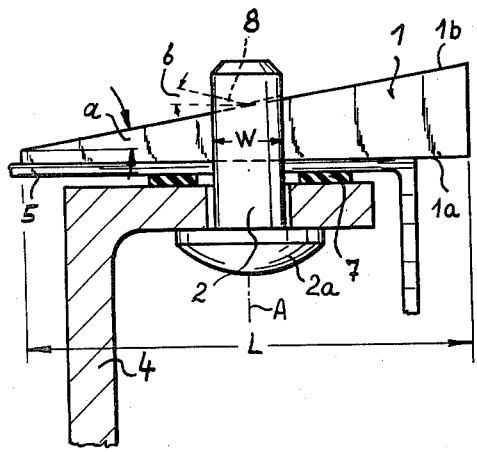
FIGS. 1 and 2 are side, partly sectional views of fasteners according to this invention.
Figure 3:
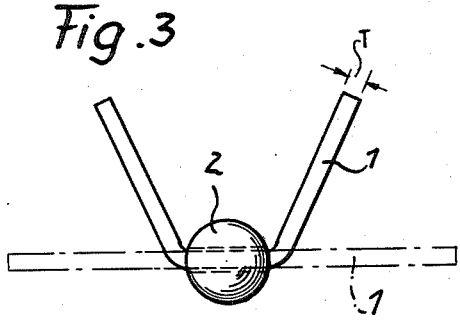
FIG. 3 is a top view of the fastener of FIG. 1.

As shown in FIGS. 1 and 3 a fastener according to the instant invention serves to secure together a pair of elements 4 and 5, the former being a support plate or flange and the latter being a cover plate. In the illustrated embodiment the element 4 is the support for a conveyor having plates 5. The two elements formed thereby have alignable throughgoing holes through which extends a bolt 2 having a head 2a bearing on the element 4. This bolt 2 has a rectangular-section transversely throughgoing hole 3 spaced by a distance S (FIG. 4) from the head 2a. A key or wedge 1 made of a rectangular-section strip of steel is formed generally as a right triangle and has one side 1a bearing on the member 5 and another side 1b forming an angle a of 10° at the side 1a and bearing on an end surface 8 of the passage 3. The surface 8 is formed of two short planar surfaces each forming an angle b equal to 20° with the plane lying on the axis A of the bolt 2.

Figure 2:
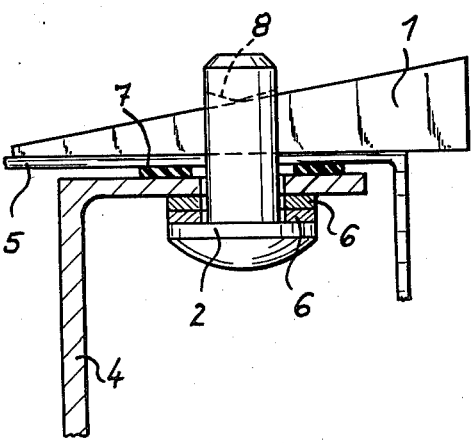
Figure 4:
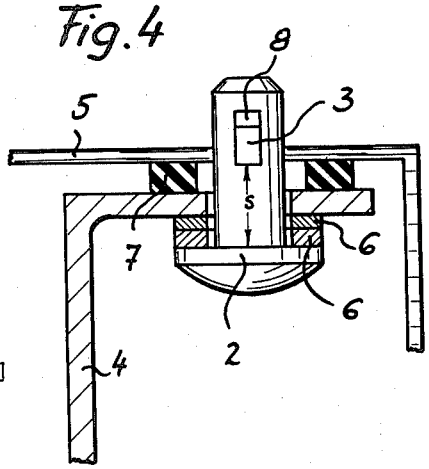
FIG. 4 is a view similar to FIGS. 1 and 2 showing a fastener according to this invention prior to installation of the wedge.
Figure 5:
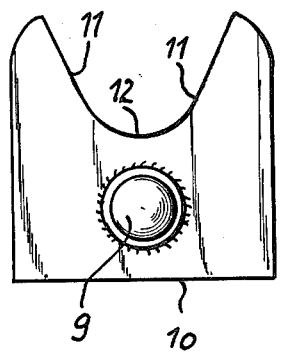
FIGS. 5 and 6 are top and side views, respectively, of a tool for installing the fastener according to this invention.
Figure 6:
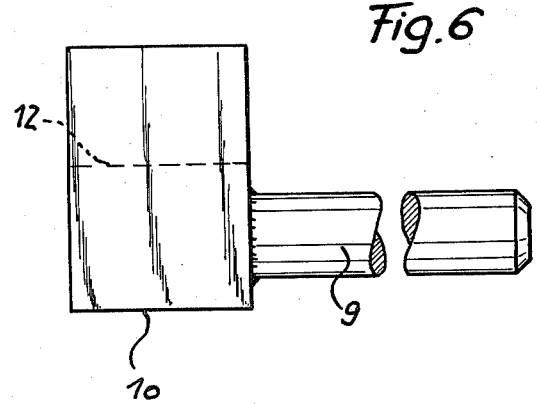

Two seal strips 7 extend along the element 4 and underneath the element 5 and flank the row of holes through which pass the succession of pins 2. In addition spacer washers 6 may be provided under the head 2a when the overall thickness of the assembly formed by the two members 4 and 5 and the seal strips 7 is less than the spacing S, as shown in FIGS. 2 and 4.

The fastener described above is assembled by means of a tool having a handle or tang 9 and having one flat driving surface 10 on one side and on the opposite face a concavity formed by a pair of sides 11 defining an angle of 110° with each other and a base 12 of semicylindrical shape. Thus once the two parts 4 and 5 are aligned and a bolt 2 has been inserted through the holes by means of a simple manual operation, the installer then inserts the narrow end of the flat wedge 1 into the passage 3, and hammers it tightly in place by means of the surface 10 of the tool. This makes the fastener very tight and compresses the seals 7. Thereafter the tool is turned around and the key 1 is struck from the side so as to bend over its two end portions from the dot-dash line position of FIG. 3 to the solid-line position of FIG. 3. The angle between the sides 11 will establish the angle the two end portions form with respect to each other. Once thus bent over moving of the key 1 relative to the fastener member 2 is impossible, so that the fastener will remain very tight. What is more it is possible for this operation to be carried out extremely easily, as once the key 1 is inserted at least partially in the passage 3 dropping-out the bolt 2 becomes impossible. In addition the camming action is extremely good, as the angle a is relatively small, so that it is possible to use a key having an overall length L equal to a multiple, here somewhat more than six times, of the width or diameter W of the stem of the fastener member 2. Furthermore this length L is here equal to approximately 25 times the thickness T (FIG. 4) of the key 1, which as described above is made of malleable material so that it can be bent as shown in FIG. 3 without breaking.

FIGS. 7–9 show another fastener according to this invention, wherein a different fastener member 2' is employed, but wherein all other structure is identical to that described above with reference to FIGS. 1–4. In addition the installation method is the same for this embodiment as for the embodiment of FIGS. 1–4.

FIG. 10 shows a steel strip 13 from which the fastener member 2' is fabricated entirely by bending. First of all as shown in FIG. 11 a dimple or bump 18 is formed in the middle of this strip 13, then two end sections 16 are bent down so as to define two further sections 15, each to a respective side of the bump 18. Thereafter as shown in FIG. 12 the end sections 16 are bent flat under the intermediate sections 15. FIG. 13 shows how the double-thickness sections at the ends are then bent up at elbows or edges 17 to form feet 19.

Finally the sections 15 are bent down parallel to each other to either side of the bump 18 as shown in FIG. 8, thereby forming a downwardly-open U stem 14 in turn defining a throughgoing passage 3' identical in function to the passage 3 of FIGS. 3–4. The outwardly turned portions 19 formed beyond the bends 17 form feet constituting a head 2a' identical in function to the head 2a of FIGS. 1–4.

The fastener of FIGS. 7–9 can be produced at considerably lower cost than the fastener of FIGS. 1–4. It will have excellent holding strength, and will be just as easy to install as the fastener of FIGS. 1–4, and, of course, much easier to install than the prior-art rivets or screws. This arrangement is ideally suitable for use, as described above, in a trough-type conveyor, an auger conveyor, or any of various arrangements where it is necessary to tightly secure two items together, but nontheless have the possibility of disconnecting them if desired. For instance in a trough-type conveyor over 100 m long where it is necessary to provide hundreds of such fasteners, often at a spacing of between 1 and 1.5 m, such a fastener is extremely advantageous. The fastener according to the instant invention allows easy installation by even a relatively unskilled worker. Furthermore removal is a relatively simple task, normally executed by straightening the key 1 and pulling it out, or simply by breaking off the narrow bent end and then pulling out the remainder. The fastener member 2 and 2' can always be reused.

I claim:

1. A fastener for joining a pair of elements, said fastener comprising:
   a fastener member having an elongated stem provided at one end with an enlarged head and formed spaced from said head with a transversely throughgoing passage, said fastener member being insertable through aligned holes in said elements with said head bearing on one of said elements and said passage exposed at the other of said elements, said fastener member being formed of a plastically deformed metal strip having a U-shaped central section and a pair of outwardly and oppositely bent legs, said central section having a bight and a pair of inner sides, said strip being bent back double at said legs and having free ends received within said U-shaped central section between said sides, said sides forming said passage with said free ends, and said bight and said legs forming said head; and
   a plastically deformable elongated wedge inserted through said passage and having an intermediate portion in said passage and a pair of end portions flanking said intermediate portion and both bent laterally out of line with said intermediate portion, said wedge further having one longitudinal edge bearing in one direction on said other element and another longitudinal edge bearing in the opposite direction on said stem in said passage and forming an acute angle with said one edge.

2. The fastener defined in claim 1 wherein said acute angle is less than 20°.

3. The fastener defined in claim 2 wherein said passage has an end surface turned toward said head and at least partially inclined to the longitudinal axis of said stem.

4. The fastener defined in claim 2 wherein said passage has an end surface engaging said other edge of said wedge and directed toward said head and an opposite end surface substantially closer to said head than said one edge of said wedge, said one edge and said opposite end surface being spaced apart.

5. The fastener defined in claim 2, further comprising a pair of generally parallel deformable seal strips between said elements and flanking said stem.

6. The fastener defined in claim 2 wherein said wedge has an overall length equal to at least twenty times its thickness measured in a direction perpendicular to its length and to said stem.

7. The fastener defined in claim 2 wherein said end portions are generally of the same length.

8. The fastener defined in claim 1 wherein said acute angle is between 8° and 12°.

9. The fastener defined in claim 1 wherein said strip is formed at said bight with a bump projecting toward said head and engaging said other longitudinal edge of said wedge.

* * * * *